July 24, 1962 M. A. POLSTER 3,046,519
ULTRASONIC VEHICLE DETECTION SYSTEM
Filed Oct. 28, 1959 6 Sheets—Sheet 1
FIG. IA.
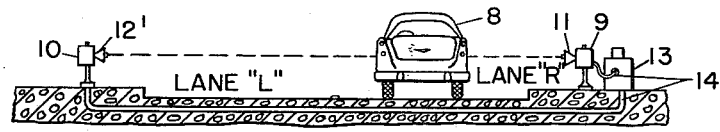
FIG. IB.
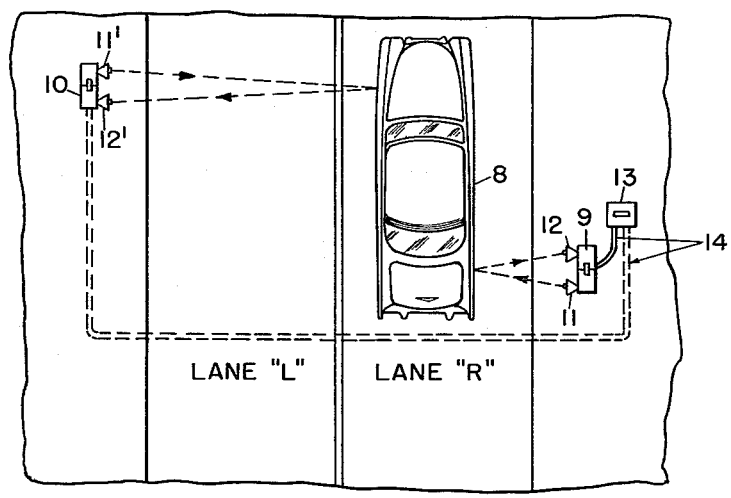
FIG. 2A.
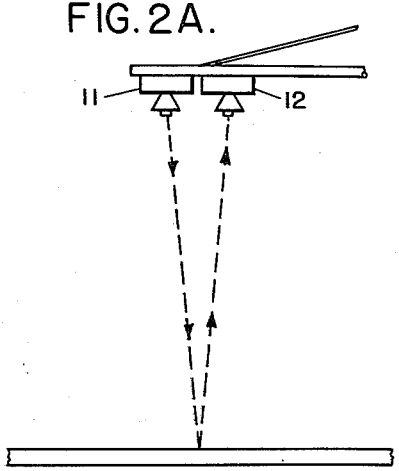
FIG. 2B.
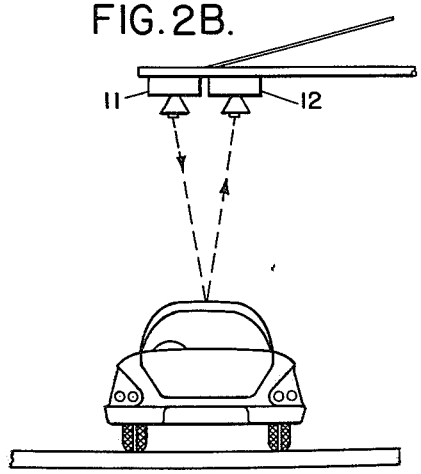
*INVENTOR.*
M.A. POLSTER
BY
*Forest B. Hitchcock*
HIS ATTORNEY

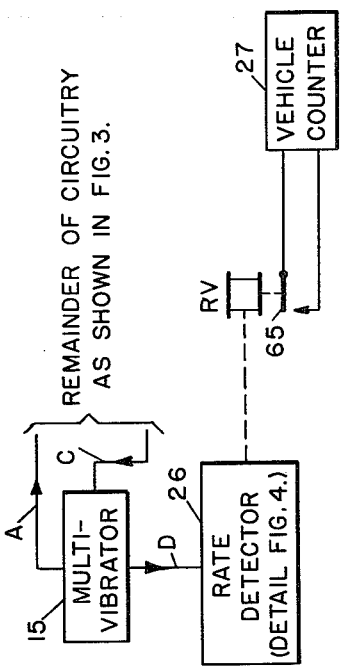

July 24, 1962  M. A. POLSTER  3,046,519
ULTRASONIC VEHICLE DETECTION SYSTEM
Filed Oct. 28, 1959  6 Sheets-Sheet 3

INVENTOR.
M.A. POLSTER
BY
*Forest B. Hitchcock*
HIS ATTORNEY

VOLTAGE WAVEFORMS
NO REFLECTIONS — MULTIVIBRATOR SELF-RUNNING AT SLOW RATE

VEHICLE REFLECTIONS TRIGGER MULTIVIBRATOR AT FAST RATE

July 24, 1962 M. A. POLSTER 3,046,519
ULTRASONIC VEHICLE DETECTION SYSTEM
Filed Oct. 28, 1959 6 Sheets-Sheet 5
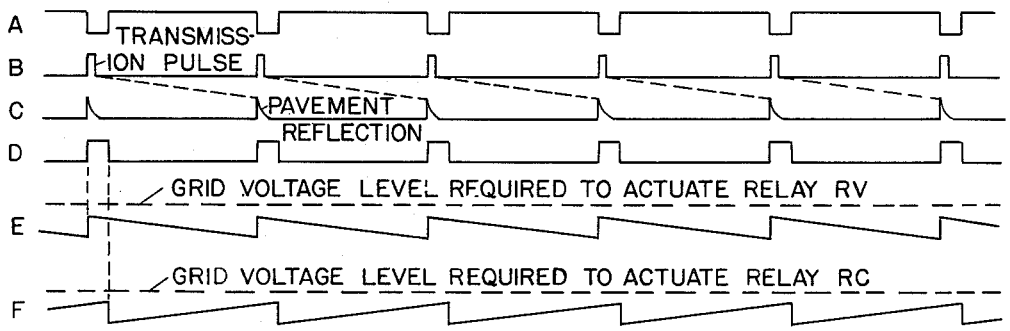
FIG. 7A. VOLTAGE WAVEFORMS
NO VEHICLE PRESENT—PAVEMENT REFLECTIONS TRIGGER MULTIVIBRATOR AT REGULAR RATE
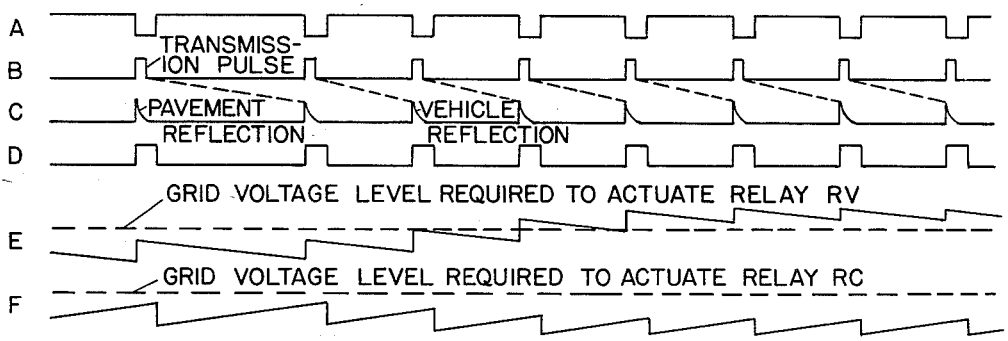
FIG. 7B. VEHICLE REFLECTIONS TRIGGER MULTIVIBRATOR AT A FAST RATE
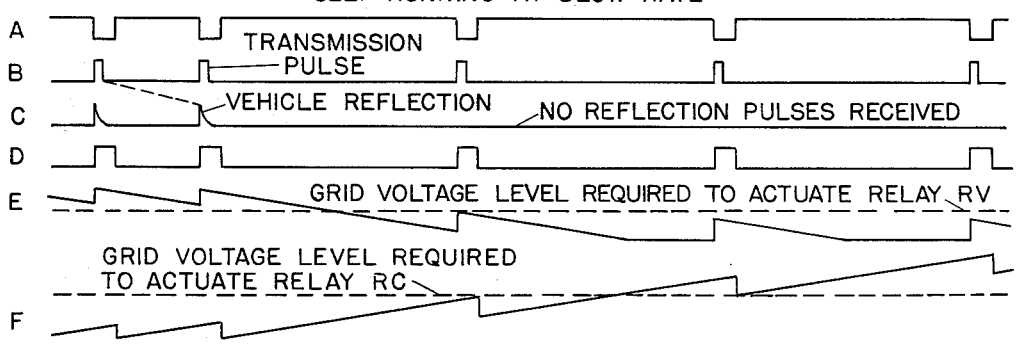
FIG. 7C. NO REFLECTIONS—MULTIVIBRATOR SELF RUNNING AT SLOW RATE
INVENTOR.
M. A. POLSTER
BY
HIS ATTORNEY July 24, 1962 M. A. POLSTER 3,046,519
ULTRASONIC VEHICLE DETECTION SYSTEM
Filed Oct. 28, 1959 6 Sheets-Sheet 6

VOLTAGE WAVEFORMS
NO VEHICLE PRESENT- PAVEMENT REFLECTIONS TRIGGER MULTIVIBRATOR

VEHICLE WITHIN DETECTION AREA
MULTIVIBRATOR SELF RUNNING AT SLOW RATE

INVENTOR.
M.A. POLSTER
BY
HIS ATTORNEY

United States Patent Office 3,046,519
Patented July 24, 1962

3,046,519
ULTRASONIC VEHICLE DETECTION SYSTEM
Morton A. Polster, Rochester, N.Y., assignor to General
Railway Signal Company, Rochester, N.Y.
Filed Oct. 28, 1959, Ser. No. 849,326
8 Claims. (Cl. 340—38)

This invention relates to the detection of objects and particularly vehicles, and more particularly pertains to such systems wherein the objects or vehicles are detected as a result of the effects produced as a result of their intersecting a beam of sound energy. This invention is analogous in subject matter to and is to be regarded as being in the nature of an improvement over what is claimed in the prior applications of H. C. Kendall, et al., Ser. No. 808,736, filed April 24, 1959; J. H. Auer, Jr., Ser. No. 820,325, filed June 15, 1959; and also my prior application, Ser. No. 845,810 filed October 12, 1959 all of which are assigned to the assignee of the present invention.

It is a common characteristic of the systems disclosed in these prior applications that a beam of repetitive sound pulses is transmitted by transmitting means including a transmitting sound transducer across the path of the objects or vehicles. A receiver which includes a receiving transducer is provided, and the receiving transducer is so positioned and directed that it receives and is responsive to the transmitted sound energy upon its reflection from the surface of the object or vehicle as it intercepts the transmitted sound beam. The repetition rate of the transmitted sound pulses is made sufficiently slow to permit each sound pulse to be received by the receiving means following its reflection from an object or vehicle within the designated detection zone prior to the transmission of the next sound pulse. This requirement eliminates ambiguity since it relates each reflection pulse definitely to the last transmitted pulse. Electronic gating circuit means are employed to demarcate an interval following the transmission of each sound pulse during which reflections of such pulses may be expected at the receiving transducer by an object or vehicle within the detection zone. The gating circuits render the receiving means responsive to received sound pulses only throughout the demarcated interval, and thereby provide time-gating discrimination against reflections which might be received either from various extraneous sources or from vehicles not within the designated detection zone.

The propagation time of a sound pulse from the transmitting means to the receiving means may vary quite considerably; for example, the distance between a car and the transmitting and receiving transducers mounted along side the highway may vary considerably according to whether the car is moving along the center lane of the highway or along its outer edge. For this reason, the time gate following the transmission of each pulse must, in these prior systems, be made relatively long if it is to accommodate this rather considerable variation in propagation time, and this, of course, limits the effectiveness of the time-gating in discriminating against spurious signals. What is even more important, however, is that this time gate must extend long beyond the transmission of each sound pulse to encompass the expected time of reception of reflection pulses having the maximum propagation time. More specifically, considering again the organization where the transmitting and receiving transducers are mounted along the edge of the highway, the time throughout which the gating means must maintain the receiving means responsive to reflected sound pulses must extend sufficiently long beyond the transmission of each pulse to accommodate a sound pulse reflected from a vehicle at the maximum expected distance from the highway's edge. This criteria then establishes the maximum repetition rate of the system and is effective at all times even though the great majority of vehicles may pass much closer to the highway's edge so that their reflection pulses are received considerably sooner by the receiving transducer. This arbitrary limitation upon the pulse repetition rate presents a serious design problem since it limits the number of reflection pulses which can be received from any vehicle passing through the detection zone, and this, in turn, tends to prevent vehicles traveling at high rates of speed from being detected.

An additional disadvantage of theese prior art systems resides in the need of employing therein the complex electronic gating circuits previously referred to. Their use increases the complexity of the over-all system and also makes it somewhat more difficult to install a vehicle detection system because of the fine adjustment required to be made on a plurality of interrelated timing circuits which must be set in accordance with the particular layout and dimensions of the specific system.

The present invention overcomes these inherent drawbacks of these systems since no time gating circuits need be employed, and it is furthermore inherent in the system of this invention that the repetition rate is always the maximum rate that can be employed for each passing vehicle, having regard to the above-mentioned requirements.

Described briefly, the present invention comprises sound pulses transmitting means having a repetition rate selected by the frequency of operation of electronic oscillating means. When no reflection pulses are received by the sound receiving means, this electronic oscillator operates in a self-running manner at some preselected relatively slow rate. In addition, this electronic oscillator is also subject to control by the output of the reflection pulse receiving means. More specifically, each received sound pulse having an amplitude sufficient to indicate that it is a bona fide reflection of a transmitted sound pulse, is applied as a triggering input to the electronic oscillator, and thus results in the generation of the next sound pulse. Each bona fide reflection pulse is received by the receiving means prior to the time that the electronic oscillator would ordinarily operate of its own accord and cause the next pulse to be transmitted so that each received reflection pulse has the effect of causing the electronic oscillator to operate somewhat more quickly than it would in the absence of such reflected pulse. Therefore, these reflection pulses cause the electronic oscillator to operate at a faster rate which is readily detectable by associated circuit means which gives a distinctive indication of such faster rate and thus indicates the presence of a vehicle.

The general principles which have been set forth are applicable to several embodiments of this invention, of which two will be disclosed in detail in this application.

It is, accordingly, an object of this invention to provide a system for the detection of objects and particularly highway vehicles wherein the vehicles are detected by the effects produced as they pass through a beam of repetitive sound pulses, but wherein, unlike the previously known systems of this general type, no electronic time-gating circuits are required.

It is another object of this invention to provide a vehicle detection system comprising apparatus for the transmission of repetitive sound pulses across the paths of the vehicles or objects, and wherein each new sound pulse is generated upon the reception of a reflection of the preceding pulse from an object or vehicle to be detected.

It is a further object of this invention to provide a system of vehicle detection comprising apparatus for the transmission of repetitive sound pulses across the path of each vehicle and wherein the maximum repetition rate of the pulses is automatically selected for each vehicle.

It is another object of this invention to provide a vehicle detection system wherein successive sound pulses are transmitted toward each vehicle, which system employs greatly simplified circuitry as compared to the previously known systems.

Other objects, purposes, characteristic features of the present invention will be obvious from the accompanying drawings and will also in part be pointed out as the description of the invention progresses.

To simplify the illustrations and facilitate in the explanation of this invention, various parts and circuits which constitute the embodiment of the invention have been shown diagrammatically and certain conventional arrangements are disclosed in block form since the drawings have been made more with the purpose of making it easy to understand the principles and manner of operation than to illustrate the specific construction and arrangement of parts that might be used in practice. Thus, the symbols (+) and (−) are used to indicate positive and negative terminals respectively of a suitable source of direct current.

In describing the invention in detail, reference will be made to the accompanying drawings in which like reference characters designate corresponding parts throughout the several views and in which:

FIGS. 1A and 1B illustrate a possible arrangement of the receiving and transmitting transducers in relation to the vehicles to be detected that may be employed when practicing one embodiment of this invention;

FIGS. 2A and 2B illustrate a possible arrangement of the receiving and transmitting transducers for an alternative embodiment of this invention;

FIG. 3 is a block diagram of the circuit organization that may be used for an arrangement of the transducers as shown in FIGS. 1A and 1B;

FIGS. 7A, 7B and 7C are waveform diagrams graphically illustrating the operation of the circuit of FIG. 6;

FIG. 8 illustrates a further modification of the system shown in block diagram form in FIG. 3 for use with the arrangement of the transducers shown in FIGS. 2A and 2B.

Figure 4:
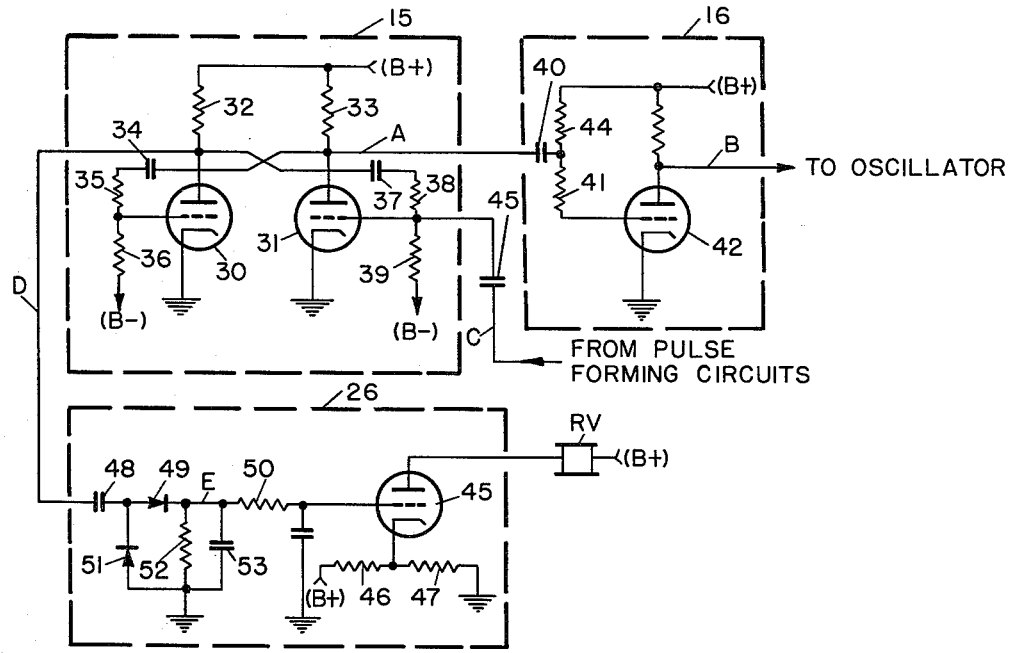
FIG. 4 is a circuit diagram illustrating a portion of the system shown in block form in FIG. 3.

FIGS. 1A and 1B illustrate one manner in which the apparatus of this invention and particularly the electroacoustical transducers may be disposed to detect the passage of vehicles moving along a highway. FIG. 1A is an elevational view showing a highway having lane L for one direction of traffic and another lane R for the opposite direction of traffic. Along each side of the highway there is positioned sound transmitting and receiving apparatus. For example, along the outer edge of lane L there is an equipment case 10 supporting a transmitting transducer 11' and a receiving transducer 12' and similar apparatus including corresponding transducers 11 and 12 is also positioned along the outer edge of the other lane R in equipment case 9. Associated sound generating, sound receiving, and amplifying means is located within an equipment case 13 which is common to both the apparatus 9 and apparatus 10 previously mentioned. Connections 14 are made from this equipment case 13 to both sets of transducing equipment; the connection 14 which is made to the equipment on the opposite side of the highway may alternatively be laid on the roadway, embedded within the roadway, or strung over the top of the roadway on suitable poles or the like.

FIG. 3 illustrates in block form the circuit means which may be employed to detect vehicles when the disposition of the transducing equipment is generally as illustrated in FIGS. 1A and 1B. A pulse generator is provided, and this pulse generator may comprise a multivibrator 15 although it should be understood that other pulse generating circuits can as well be used that can provide a controllable frequency of operation. The multivibrator 15 is of the kind which is known as a self-running multivibrator in that it will operate continuously at a predetermined rate and to provide a distinctive square wave of output voltage for each cycle of operation. The multivibrator 15 is additionally subject to operation by an input pulse which can effect a more rapid operation of the multivibrator. In other words, the application of an input pulse to the multivibrator somewhat prior to the time when it would ordinarily trigger itself will trigger the multivibrator so that it will operate more quickly than it would in the absence of such input pulse.

Described briefly, the circuit organization of FIG. 3 operates in such a manner that a short pulse of sound energy is transmitted by the transmitting transducer for each cycle of operation of the multivibrator 15. The frequency of operation of the multivibrator when self-running is selected so that the interval between successive pulses is substantially in excess of the propagation time of a pulse from the transmitting transducer to a vehicle within the monitored lane and back to the receiving transducer. With no vehicle present in the monitored lane, the multivibrator when operates at a relatively slow rate, and there is a correspondingly slow repetition rate for the transmitted pulses. However, when a vehicle is present in the monitored lane, each generated sound pulse produces a corresponding reflection pulse in the receiving transducer, and this received pulse is effective when its amplitude is above a predetermined minimum value, to trigger the multivibrator 15 so that another sound pulse is transmitted. For vehicles traveling in the monitored, near lane, each reflection pulse is received fairly quickly following its transmission because of its relatively short path length as can be noted in FIG. 1B, and this means that the multivibrator will receive a triggering input to effect the next cycle of operation much more quickly than when no vehicle is present and the multivibrator is operating at its normal self-running rate. It is this increase in operating rate of the multivibrator which is detected and utilized to provide a distinctive indication of the presence of a vehicle.

Figure 5A:
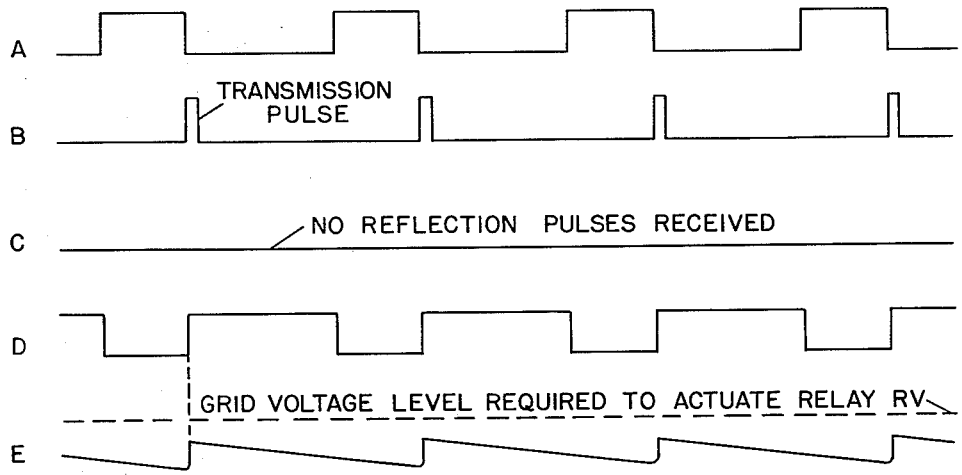
FIGS. 5A and 5B are waveform diagrams graphically illustrating the operation of the circuits of FIG. 4.

Referring again to FIG. 3, the square wave output of the multivibrator (FIG. 5A, line A) is applied to an oscillator gating circuit 16. Each negative-going voltage variation of the multivibrator output causes the oscillator gating circuit 16 to provide a positive gating voltage which may be of several milliseconds duration as indicated at waveform B of FIG. 5A. This voltage gates the oscillator 17 to an "on" condition wherein it will provide an output comprising a plurality of successive cycles of an alternating-current signal at a predetermined frequency, which may be assumed for the purpose of the present disclosure to be approximately 20 kc. The successive pulses of 20 kc. electrical energy are applied through a band-pass filter 18 to a power amplifier 19 where they are amplified before being applied to the transmitting transducer 11. The sound pulses that are generated by the transducer 11 are directed across the paths of vehicles in the monitored lane, as indicated in FIGS. 1A and 1B.

Any sound pulses that impinge upon the receiving transducer 12 are converted by it to corresponding electrical energy which is fed to a tuned amplifier 22. This amplifier, by reason of its tuning, tends to reject received sound pulses which are not of the 20 kc. frequency of the transmitted pulses with the result that the signal applied to the rectifier-filter 23 comprises a pulse of electrical energy of 20 kc. frequency corresponding to each reflection of a transmitted sound pulse impinging upon the receiving transducer 12. The function of the rectifier-filter 23 is that of the usual detector in that it provides a unidirectional filtered output corresponding to the envelope of the rectifier output of the tuned amplifier 22.

The level detector 24 has the function of providing an output signal to the pulse forming circuits 25 only for those levels of input signal applied thereto whose amplitude is above a preselected minimum value. In practice, this minimum value is selected to be in excess of that representing the level of signal at this point in the circuit produced by reflection pulse from a vehicle in the far lane, bearing in mind that the amplitude of sound varies inversely with the path length. Thus, the level detector is controlled to provide an output signal in response to the large amplitude reflection pulse that is received from a vehicle in the near lane but not for the considerably lower amplitude reflection pulse received from a vehicle in the far lane. Referring specifically to FIGS. 1A and 1B, it is apparent that the vehicle 8 in lane R will provide a large amplitude of reflection pulse at transducer 12 as compared to that provided at transducer 12′ on the opposite side of the highway. The level detector 24 associated with transducers 12 and 12′ respectively, discriminate on the basis of amplitude between these reflection pulses so that only the pulse forming circuits 25 associated with transducer 12 receive an input pulse as vehicle 8 moves along lane R.

The pulse forming circuits 25 may be of any well-known kind which are effective to provide an output triggering pulse having a known and fixed wave shape and amplitude in response to an input signal. For this purpose, a multivibrator with associated electronic pulse forming circuits or instead a blocking oscillator may be provided which will supply a trigger pulse to the multivibrator 15 for each output signal provided by the level detector 24. Each such output pulse of the pulse forming circuits 25 may thus be of the form shown in line C of FIG. 5B and will cause the multivibrator 15 to be operated to the opposite condition to thereby initiate the next cycle of operation and cause another sound pulse to be transmitted. In summary, when a vehicle is present in the near lane, the received reflection pulses tend to trigger the multivibrator at an earlier time than it would ordinarily trigger itself when self-running so that its frequency of operation is substantially increased. In contrast, when no reflection pulses are received because no vehicle is present upon which the transmitted pulses can impinge, or when the received reflection pulses are of such lower amplitude that no corresponding pulses are provided by level detector 24, there is no output supplied by the pulse forming circuits 25 (FIG. 5A, line C) and the multivibrator 15 is then entirely self-running. Because of this, it operates at a much slower rate.

The rate detector 26 is connected to the multivibrator 15 and is responsive to changes in operating rate of the multivibrator 15 as will be pointed out in detail later. The rate detector 26 controls a relay RV which is in a dropped-away condition when the multivibrator is operating at its normal, slow self-running rate, but is picked up when the multivibrator 15 operates more rapidly in response to reflection pulses. The contacts of this relay may be used to operate any associated apparatus such as the vehicle counter 27 whose count may be changed one unit for each closure of the front contact 28 of relay RV.

FIG. 4 illustrates in detail a portion of the circuit organization shown in block diagram form in FIG. 3. In particular, the multivibrator 15, oscillator gating circuit 16, and rate detector 26 are shown in circuit diagram form; since the remaining circuitry corresponding to the other blocks of FIG. 3 can be of conventional form its operation can readily be understood by those skilled in the art from the description given herein and the waveform diagrams so that it will not be described in detail.

The multivibrator 15 includes two triode tubes 30 and 31, both having their cathodes grounded and their plates connected through resistors 32 and 33, respectively, to the (B+) source of voltage. The plate of tube 31 is connected through capacitor 34 and resistor 35 to the control grid of tube 30, which grid is also connected through resistor 36 to the (B−) source of voltage. The plate of tube 30 is connected similarly through capacitor 37 and resistor 38 to the control grid of tube 31 and this grid is connected through resistor 39 to the (B−) source of voltage.

The characteristics and mode of operation of a multivibrator of this kind are well known and need not be described in any great detail. It is characteristic of such a multivibrator that it has two different operating states, one being that wherein tube 30 is fully conductive and tube 31 fully non-conductive and a second state wherein the conductive conditions of the two tubes is directly opposite to that just described, the switching action between the two states occurring almost instantaneously. When one tube, such as tube 31 becomes conductive, its plate voltage is abruptly lowered in amplitude and this causes a negative voltage pulse to be applied through the capacitor 34 and resistor 35 to the control grid of the other tube 30, thereby causing this latter tube to be driven far below cut-off. The multivibrator then remains in the state where tube 31 is conductive and tube 30 cut off for a length of time determined by the discharge time constant for capacitor 34. As this capacitor 34 discharges, the voltage at the grid of tube 30 rises, and when it has risen sufficiently for tube 30 to conduct even a slight amount of plate current, a regenerative switching action occurs which immediately reverses the relative conductive states of the two tubes so that tube 31 then becomes fully cut off while tube 30 is fully conductive. This latter state is maintained, similarly, for an interval determined by the discharge time constant provided for capacitor 37. In the absence of any other input to the multivibrator, it thus operates in a self-running manner continually with its period of operation being determined by the time constants for the discharging of capacitors 34 and 37. According to the waveform diagram of FIG. 5A, it is shown that the multivibrator is organized to operate in an asymmetric manner, i.e., tube 31 is conductive for a relatively longer period of time as compared with tube 30, when the multivibrator is self-running. It will be appreciated from the description that follows, however, that the characteristics of this self-running operation of the multivibrator need not be limited to the particular asymmetrical output shown in FIG. 5A.

The output voltage of the multivibrator may be obtained from the plate of either or both of the two tubes. The voltage which is obtainable from the plate of tube 31 may have the waveform illustrated at line A of FIG. 5A. Of course, the voltage which is available at the plate of tube 30 and shown in line D is just the reverse of that shown in line A in that the tube 30 plate voltage is at a high level when the plate voltage of tube 31 is at a low level and vice versa.

The square wave of voltage at the plate of tube 31 is applied through a capacitor 40 and resistor 41 to the control grid of tube 42. The grid circuit of tube 42 including the capacitor 40, resistor 41 and resistor 44 is organized to operate as a differentiating circuit. Such circuits are also in common use in the electronic art and thus need not be described here in great detail. Briefly, the effect of such a circuit organization is to provide at the plate of tube 42 a relatively short, positive-going trigger pulse for each abrupt negative-going voltage variation at point A. In contrast, a positive-going voltage variation at point A produces substantially no effect on the voltage at the plate of tube 42. The result then is that the voltage obtained at the plate of tube 42 is as represented at line B of FIG. 5A.

Each positive-going trigger pulse applied to the input of oscillator 17 sets this oscillator into operation throughout the duration of the trigger pulse. The oscillator may be of any conventional type, being normally in an inoperative state and being rendered operative only by the gating input voltage obtained from the oscillator gating circuit 16. As indicated in FIG. 3, the oscillator may be organized to provide an output at a frequency of 20 kc., but obviously other frequencies can equally well be used.

The multivibrator 15 shown in detail in FIG. 4 is also subject to a further control in the form of pulses which may be applied through capacitor 45 to the control grid of tube 31. These pulses are obtained from the pulse forming circuits 25 and each represents a reflected sound pulse impinging upon the receiving transducer and being of sufficient amplitude to provide an output from the level detector 24 in the manner described previously.

As described above, the frequency of operation of the multivibrator 15 is selected so that its normal, self-running period will be in excess of the propagation time of a sound pulse from the transmitting transducer to the receiving transducer when there is a reflection from a vehicle which is to be monitored by the system. Stated another way, this means that whenever there is a reflection from a vehicle in the monitored lane the pulse forming circuits 25 will provide a trigger pulse to tube 31 somewhat prior to the time that the multivibrator would ordinarily operate of its own accord and generate the next sound pulse. By comparing lines B and A of either FIG. 5A or 5B, it can be observed that a sound pulse is generated each time that tube 31 goes from its cut-off condition to the fully conductive condition. Therefore, a positive-going trigger pulse from the pulse forming circuits 25 and applied through capacitor 45 to the grid of tube 31 will have the effect of hastening the multivibrator switching action, thereby causing tube 31 to be switched somewhat more quickly from its nonconductive to the conductive condition. This action is clearly illustrated in line C of FIG. 5B which shows that a positive-going trigger pulse obtained from the pulse-forming circuits and appearing at point C of FIG. 4 will act to switch the state of the multivibrator more quickly than it ordinarily would operate of its own accord. The result of causing the multivibrator to be switched more quickly to its opposite state is to increase its frequency of operation as graphically illustrated by comparing line A of FIG. 5B with line A of FIG. 5A.

The rate detector 26 comprises the triode tube 45 whose plate circuit includes the winding of relay RV and whose cathode is connected to the junction of resistors 46 and 47 connected in series between (B+) and ground. The grid of tube 45 receives an input at point D from the plate of tube 30 in the multivibrator 15, and the plate of tube 30 is connected through capacitor 48, rectifier 49 in forward, low resistance direction, and through resistor 50 to the grid of tube 45. The junction of capacitor 48 and rectifier 49 is connected through a rectifier 51 in the reverse or high resistance direction to ground, and the junction of rectifier 49 and resistor 50 is connected through resistor 52 and capacitor 53 in parallel to ground.

The grid circuit organization of tube 45 thus comprises what may be generally described as a positive counting circuit. Such a positive counting circuit is disclosed and described in detail on pages 231 and 232 of the publication Radar Electronic Fundamentals, NAVSHIPS 900,016, published by the Bureau of Ships of the U.S. Navy (June 1944), and reference may be made to such publication for a detailed description of its operation. It may, nevertheless, be briefly stated that each positive-going voltage variation at the plate of tube 30 (shown in waveforms as line D) places an increment of positive charge to the upper terminal of capacitor 53. Since each of the successive positive-going voltage variations are all of uniform amplitude, the positive voltage at the upper terminal of capacitor 53 is dependent upon their frequency. In other words, for each frequency of operation of the multivibrator, there is a corresponding average level of voltage across capacitor 53, and for this level of voltage the increment of charge received in response to each positive-going voltage variation exactly equals the amount of charge lost by capacitor 53 between successive positive-going voltage variations as it discharges through the parallel resistor 52.

The cathode of tube 45 is positively biased by being connected to the junction of resistors 46 and 47 and the relative values of these resistors are selected so that tube 45 will not conduct sufficient plate current to pick up relay RV when the voltage of capacitor 53 is that occurring when the multivibrator is operating at its normal slow self-running rate. However, when the reception of reflections pulses from a vehicle in the monitored lane causes the multivibrator to operate with a higher frequency, the voltage at the upper terminal of capacitor 53 increases accordingly so that the grid of tube 45 is driven more positive with respect to the permanently positive cathode with the result that sufficient plate current then passes through the winding of relay RV to pick this relay up. For each passing vehicle, therefore, the relay RV is picked up momentarily, and it drops away again between successive vehicles as the frequency of operation of the multivibrator is reduced to the slower self-running rate and capacitor 53 discharges. The contacts of relay RV may be used for various purposes, and as indicated at FIG. 3, may be used to actuate a vehicle counter 27.

Figure 5B:
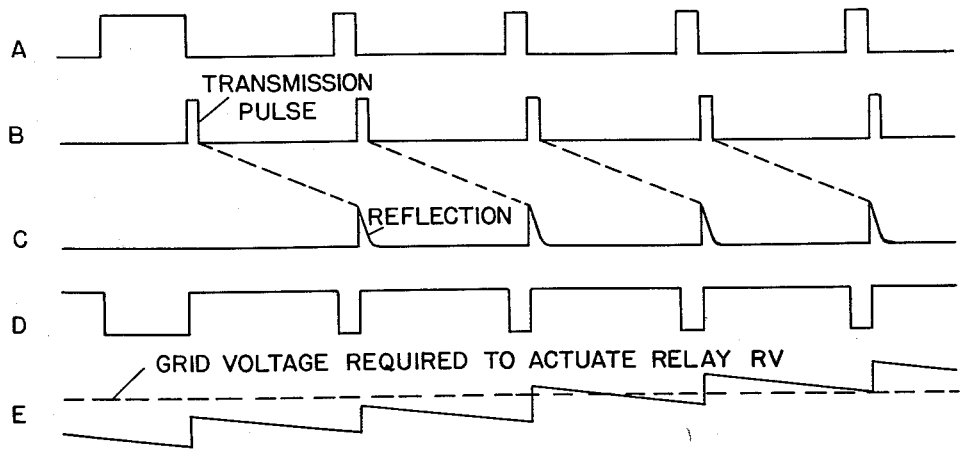

With this understanding of the mode of operation of the invention, further reference will now be made to FIGS. 4 and 5B to describe a further feature of the present invention. The multivibrator 15 is susceptible to triggering in response to a reflection pulse only when tube 31 is nonconductive since, obviously, a positive-going pulse at the grid of this tube when it is conductive cannot effect a reversal of state of the multivibrator. The effect of this is that the system is immune to reflection pulses received whenever tube 31 is conductive. Therefore, the "on" time of tube 31 may be extended to encompass that entire interval following the transmission of each sound pulse during which reflection pulses are not expected to be received. In this way, a considerable measure of immunity from spurious reflections is achieved.

*Alternative Embodiment of Invention*

Consideration will now be given to the organization and mode of operation of an alternative embodiment of this invention, having particular reference to FIGS. 2A and 2B, FIG. 3, FIG. 6, and FIGS. 7A, 7B and 7C.

For this embodiment of the invention, both transmitting and receiving transducers 11 and 12 are so positioned that, in the absence of any vehicle, each sound pulse transmitted from the transmitting transducer is reflected from a fixed reflecting surface back to the receiving transducer. When a vehicle is present, these reflections from the fixed reflecting surface are blocked and sound pulses are then reflected instead from the sound reflective surfaces of the vehicle. One way in which this mode of operation may be effected is illustrated in FIGS. 2A and 2B which show the transducers 11 and 12 mounted over the top of a roadway and both directed vertically downward toward the pavement. Any of various means may, of course, be used for supporting the transducers in this position such as an overhead cross arm, for example. As shown in FIG. 2A, in the absence of any vehicle, reflections of transmitted sound pulses are received regularly from the ground or pavement; however, when a vehicle is present as in FIG. 2B, reflections can no longer be received from a constant, known rate as it is driven by sound pulses received from the pavement. As shown at line E, the average level of voltage at point E in the grid circuit of tube 45 in the rate detector 26 is below that required to actuate relay RV. At the same time, this frequency of operation of the multivibrator is sufficient to maintain the voltage in the grid of tube 57 (see line F) at an average level more negative than that which will permit tube 57 to conduct and pick up relay RC. Both relay RV and RC are, therefore, dropped away when the multivibrator is being triggered by the pavement reflections.

When a vehicle is present and providing sound reflections causing the multivibrator to operate at the faster rate, the voltage in the grid circuit of tube 45 rises as illustrated at line E of FIG. 7B and quickly reaches the level where tube 45 will conduct sufficiently to pick up relay RV. This increased frequency of operation at the same time has the effect of driving the grid of tube 57 more negative as indicated at line F of FIG. 7B so that relay RC remains dropped away.

When no reflection pulses are received so that the multivibrator is operating at its self-running, slow rate, the grid voltage of tube 45 becomes more negative as compared to its normal value so that relay RV is dropped away. However, the average level of voltage at the grid of tube 57 increases as shown at line F of FIG. 7C with the result that relay RC picks up.

*Modification of Alternative Embodiment of Invention*

Figure 9A:
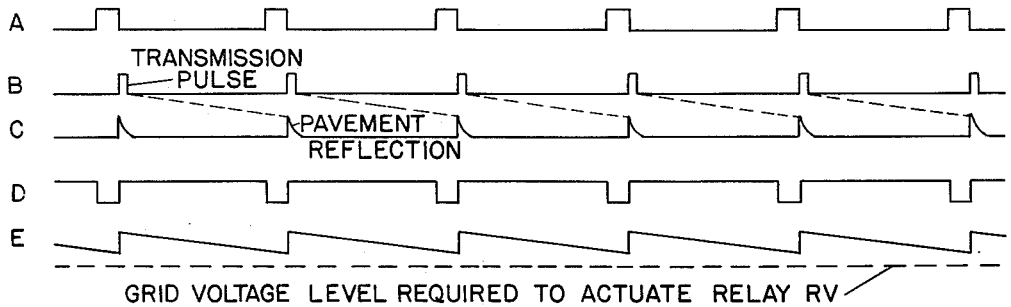
FIGS. 9A and 9B are waveform diagrams graphically illustrating the operation of the modified circuits referred to in FIG. 8.
Figure 9B:
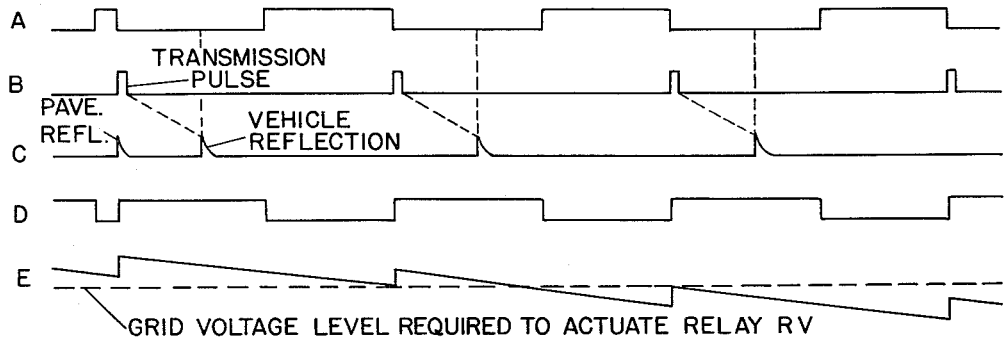

FIG. 8 shows a simple modification that can be employed when the invention is adapted for use in conjunction with a fixed reflecting surface such as is shown in FIGS. 2A and 2B, wherein the pavement is utilized as the fixed reflecting surface. In describing this modification reference will be made to FIGS. 9A and 9B which illustrate waveforms taken at the various points of the modified circuits referred to in FIG. 8. FIG. 9A assumes that no vehicle is present in the detection area beneath the transducers, while FIG. 9B assumes the presence of a vehicle within the detection area.

In this modification, the same general circuitry as shown in FIGS. 3 and 4 and explained in detail above is used with certain minor changes. The value of the various R-C time constant components of multivibrator 15 are varied to produce a very slow self-running rate in which tube 31 (FIG. 4) remains conductive for a period only slightly shorter than the interval required to receive a reflected pulse from the pavement following each transmission pulse. This is illustrated at line A in FIG. 9A.

It will be remembered that, as pointed out above, positive trigger pulses received at the grid of tube 31 during its conductive period will have no effect on the rate of operation of multivibrator 15. Since tube 31 remains conductive until only shortly before the time in which a trigger pulse is normally expected in response to a pavement reflection, pulses reflected from surfaces nearer than the pavement, namely, the tops of passing vehicles, will result in the production of trigger pulses during the period in which tube 31 is still conductive (line C in FIG. 9B). Thus, pulses reflected from the surfaces of passing vehicles will not trigger multivibrator 15 and it will return to its very slow self-running rate (lines A and D in FIG. 9B) until triggered once again by a pavement reflection.

The values of the components of rate detector 26 (FIG. 4) are modified so that when multivibrator 15 is being normally triggered by the pavement reflections, the average voltage level at the grid of tube 45 is just sufficient to maintain relay RV in its picked-up position as shown at line E in FIG. 9A. However, whenever multivibrator 15 slows to its self-running rate, this voltage level drops below the cutoff potential of tube 45 (line E in FIG. 9B) and relay RV drops away. Since, with no vehicle present in the detection area, pavement reflections are normally received triggering the multivibrator, and since the multivibrator slows down when reflections are received from the surfaces of a passing vehicle, each closure of back contact 65 of relay RV may be used to operate vehicle counter 27, changing its count by one unit.

This modification has the distinct advantage of a very high degree of discrimination against spurious sound energy which, if it should be of great enough amplitude and contain overtones of the transmitted frequency, may result in erroneous triggering of the multivibrator at a faster rate. It should be obvious that the long conductive period of tube 31 (FIG. 4) makes the multivibrator relatively immune to such possible erroneous trigger pulses, and, further, should such spurious triggering occur during the short non-conduction period of tube 31, it would only further increase the average voltage at the grid of tube 45 (line E) and would not effect any change in relay RV which would remain picked up.

Also, the problem of discriminating between variations in voltage levels (line E) created by the different possible rates of multivibrator operation in response to the variation in the heighths of passing vehicles is avoided, since this modification utilizes only two known voltage levels, namely, the one in response to the fast rate triggered by pavement reflections and the other in response to the slow self-running rate of the multivibrator.

Another obvious advantage of this modification lies in its ability to provide only a single count for each passing convertible without necessitating the use of a second interlocked relay. That is, when a convertible enters the detection area, the pulses reflected from its hood are received during the period in which tube 31 is still conductive, allowing the multivibrator to return to its very slow self-running rate. When the top of the convertible passes through the detection area, absorbing the sound energy transmitted from the transducer, the multivibrator continues at its self-running rate since no reflections are available for triggering it. Since the reflections from the trunk area of the convertible provide the same result as the reflections from the hood, the multivibrator is maintained at its slow self-running rate during the entire passage of the convertible.

It will be appreciated that this last discussed modification could be similarly accomplished by using rate detector 26a (FIG. 6) instead of rate detector 26 as was described above. In his way, the circuit components could be arranged so that relay RV would normally remain dropped away, being picked up only when the multivibrator slows to its self-running rate allowing the voltage at the grid of tube 57 to rise above the cutoff potential.

It should also be noted that whenever the invention is adapted for use with a fixed reflecting surface, level detector 24 (FIG. 3) would not be required since pulses will not be received from surfaces more distant than the fixed reflecting surface.

Having described various embodiments of an invention providing for the detection of objects or vehicles by means of the effects produced by such vehicles as they pass through a beam of repetitive sound pulses, I desire it to be understood that various modifications, adaptations, and alterations may be made to the specific forms shown to meet the requirements of practice without in any manner departing from the spirit or scope of this invention.

In particular, it should be understood that, although the appended claims refer to the system of this invention as being particularly organized for the detection of vehicles, the principles of this invention apply equally well to the detection of other objects as well.

What I claim is:

1. In a system for detecting the presence of vehicles moving along a defined path, the combination comprising, sound pulse transmitting means, sound pulse receiving means, said transmitting means directing a beam of sound pulses across said path so as to impinge upon a fixed reflecting surface only in the absence of a vehicle and being the ground or pavement but can now be received only from the tops of passing vehicles.

Figure 6:
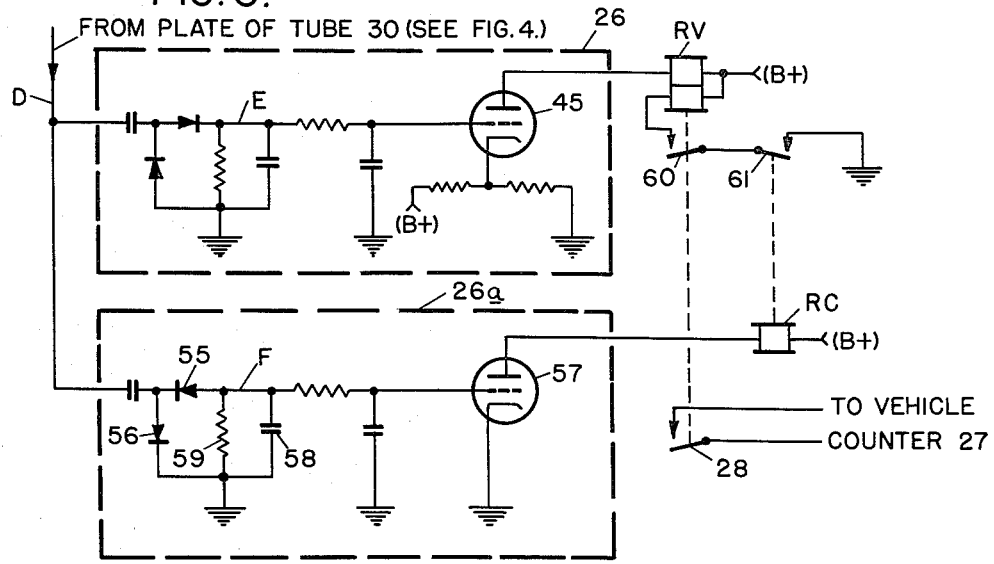
FIG. 6 is a circuit diagram of a portion of the system shown in block diagram form in FIG. 3 and as modified for use with the arrangement of the transducers shown in FIGS. 2A and 2B.

The circuit organization which may be employed for this alternative embodiment of the invention corresponds generally to that shown in block diagram in FIG. 3 but has been further modified according to FIG. 6. This modification of FIG. 3 amounts to the addition of a second rate detector 26a operating a respective relay RC. More specifically, whereas the embodiment previously described includes only the single rate detector 26 associated with multivibrator 15 for operating the single relay RV, the embodiment presently being described (see FIG. 6) employs two different rate detectors, 26 and 26a) both receiving their inputs from the multivibrator 15 and each operating a respective relay RV and RC.

From the description of FIGS. 2A and 2B that has been given, it is apparent that the normal condition is one wherein reflection pulses are being received from the pavement. The level detector 24 of FIG. 3 is controlled to provide output pulses, one for each pavement reflection, to the pulse-forming circuits 25. Thus, the multivibrator 15 continually receives a triggering input when no vehicle is present and is normally not self-running as in the previously-described embodiment but is instead driven by the reflected pavement pulses. Since the propagation time of a pulse from the transmitting transducer to the pavement and then back to the receiving transducer is a constant, the multivibrator is driven by the pavement pulses at a known, constant rate.

In contrast, when a vehicle is present as in FIG. 2B, pulses are now received by the transmitting transducer from the top of each vehicle and, since the transit time of each received pulse is appreciably shorter than that of a pavement reflection pulse, the frequency of operation of the multivibrator is increased. The rate detector 26 of FIG. 6 detects this increase in frequency of the multivibrator 15 and causes the relay RV to be picked up. It can readily be seen that this rate detector 26 is identical to that illustrated in FIG. 4. It is so organized that the relay RV is in the normal, dropped-away condition for that frequency of operation of multivibrator 15 which results when no vehicle is present and the multivibrator is driven by the pavement reflections.

Certain vehicles such as convertible automobiles have, over a portion of their length, a top surface which is not sonic reflective in character but tends instead to absorb the transmitted sound pulses. When such a vehicle intercepts the beam of sound pulses of FIGS. 2A or 2B, the frequency of operation of multivibrator 15 is first increased when reflected sound pulses are received from the metallic, sonic reflective hood of the vehicle. However, when the cloth top of the vehicle is within the sonic beam, no reflections are directed back to the receiving transducer with the result that no driving pulses are obtained from the pulse forming circuits 25 for driving the multivibrator. In the absence of any such triggering pulses, the multivibrator can operate only at its own preselected self-running rate and this rate is not only slower than the rate at which it operates when a normal vehicle is present, but is even substantially slower than the rate of operation occurring when the multivibrator is driven by the pavement reflections. The rate detector 26a illustrated in FIG. 6 detects the fact that the multivibrator is operating at this slower, self-running rate and causes the relay RC to pick up.

The rate detector 26a of FIG. 6 is in general similar to the rate detector 26. One distinguishing characteristic, however, is that the two rectifiers 55 and 56 are poled oppositely to that of the corresponding rectifiers 49 and 51 of the rate detector 26. Because of this, the circuit organization associated with the grid of tube 57 operates as what might be described as a negative counting circuit. This negative counting circuit is also disclosed and described in detail at pages 232 and 233 in the above mentioned publication Radar Electronic Fundamentals. Briefly, the capacitor 58 is negatively charged at its upper terminal with a voltage whose average level is dependent upon the rate of occurrence of negative-going voltage variations at the plate of tube 30 included in the multivibrator 15. Under normal conditions, when the multivibrator 15 is being driven by the pavement reflections, the capacitor 58 is charged sufficiently negatively that the grid of tube 57 is below the cut-off level with respect to its grounded cathode. For the higher rate of operation of multivibrator occurring when a vehicle is present and providing reflection pulses, the negative charge at the upper terminal of capacitor 58 becomes greater and tube 57 is then driven still further beyond cut off so that relay RC remains deenergized. However, when a vehicle such as a convertible passes through the sound beam and the sound pulses are absorbed by the cloth top so that the multivibrator 15 can operate only at its slower, self-running rate, the charge across capacitor 58 is quite quickly reduced as the capacitor discharges through the parallel resistor 59. The voltage on the grid of tube 57 then increases toward ground and finally becomes sufficiently less negative with respect to the grounded cathode that tube 57 becomes conductive and relay RC picks up (see line F, FIGS 7A, 7B and 7C).

The picking up of relay RC provides an alternative circuit for the energization of relay RV and prevents this latter relay from dropping away during the time that no sound reflections are received from the cloth top of the vehicle. This alternative circuit energizes the lower winding of relay RV through a circuit extending from (B+), through such lower winding of relay RV, the front contact 60 of relay RV, and front contact 61 of relay RC, to ground.

The mode of operation of this circuit organization is thus as follows: Upon the passage of the usual type of automobile, relay RV is picked up momentarily and then drops away again as the vehicle passes out of the beam of sound pulses. Relay RC does not pick up because the multivibrator 15 does not have the opportunity at any time to operate at its slow self-running rate. However, for a vehicle such as a convertible, relay RV is picked up when the front part of the vehicle including the hood provides reflection pulses which trigger the multivibrator at the more rapid rate. When the cloth top is within the beam of pulses, no triggering inputs are applied to the multivibrator so that it can then operate at its slow, self-running rate. This quickly causes the deenergization of the upper winding of relay RV, but this relay cannot drop away because of the stick circuit now provided for it by relay RC which has been picked up by the action of the rate detector 26a which is distinctively responsive to this lower frequency of operation of multivibrator 15. When the rear portion of the vehicle including the sonic reflective trunk surface passes through the sound beam, the multivibrator immediately speeds up its operation so that relay RC drops away to open the above-mentioned stick circuit and at the same time the upper winding of relay RV is again energized. Finally, when the vehicle recedes from the detection zone, the upper winding of relay RV is also again deenergized so that it can drop away. Although the relay RV is energized at two different times for one vehicle from the rate detector 26, it only goes through a single cycle of operation, being picked up upon the approach of the vehicle dropping away as it passes out of the detection zone so that only a single input count is applied by means of the closure of front contact 28 to the associated vehicle counter 27 (see FIG. 3).

The mode of operation of this alternative embodiment of the invention is graphically illustrated as well in FIGS. 7A, 7B and 7C. In each waveform diagram, five waveforms are shown, the first four corresponding to the waveforms shown in each of FIGS. 5A and 5B and the fifth, at line F, representing the voltage at point F in the input circuit of the tube of the second rate detector 26a of FIG. 6. FIG. 7A shows the multivibrator operating at reflected by said fixed reflecting surface to said receiving means, gating means for controlling said receiving means to be responsive only to received reflection pulses obtained from said fixed reflecting surface, said receiving means controlling said transmitting means to transmit the next successive sound pulse at the time of reception of a reflection pulse occurring at a time when said receiving means is responsive, whereby said transmitting means transmits successive sound pulses at a predetermined frequency when no vehicle is present, said transmitting means being self-operating when not being controlled by said circuit means and having a frequency of operation when self-operating which is less than said predetermined frequency, and means being distinctively controlled by the frequency of operation of said transmitting means for providing a distinctive indication of the presence of a vehicle.

2. The system defined in claim 1 wherein said defined path is along a roadway and transducer means is associated with both said transmitting means and said receiving means and is positioned over the top of said roadway, said transmitted sound pulses being directed downwardly toward said roadway and being reflected from the surface thereof in the absence of any vehicle back toward said transducing means associated with said receiving means.

3. In a system for detecting the presence of vehicles moving along a roadway, the combination comprising, transmitting means including transducing means for transmitting a beam of sound pulses toward the surface of said roadway and across the path of said vehicles, receiving means also including transducing means being positioned and directed to receive reflections of said sound pulses from said roadway surface, whereby said beam is interrupted by each vehicle to thereby prevent reflection pulses from said roadway surface from being received by said receiving means, said transmitting means including first timing circuit means demarcating a time interval subsequent to the transmission of each sound pulse and encompassing the expected time of reception by said receiving means of said reflection pulse from said roadway surface but not the expected reception time of reflection pulses from a vehicle within said beam, circuit means controlling said transmitting means to transmit another sound pulse only in response to an output of said receiving means occurring during said limited time interval demarcated by said timing circuit means, said transmitting means including second timing circuit means for controlling said transmitting means to transmit said another sound pulse at a later time following said limited time interval whenever no reflection pulse from said roadway surface is received by said receiving means during said limited time interval, whereby said transmitting means transmits successive sound pulses at a slower rate when no reflection pulses are received from said roadway surface than when reflection pulses are received from said roadway surface, and means being distinctively controlled by the rate at which sound pulses are transmitted by said transmitting means for providing a distinctive indication of the presence of a vehicle.

4. The combination set forth in claim 3 wherein said transmitting means includes an astable binary device operable between distinctive first and second conditions and transmitting a sound pulse each time it is operated from its first to its second condition, said first timing circuit means operating said binary device back to its said first condition after being operated to said second condition at the beginning of said limited time interval, said output of said receiving means occurring during said limited time interval operating said binary device to its said second condition, said second timing circuit means operating said binary device to its said second condition in the absence of any received reflection pulse from said roadway surface at a time subsequent to the expected time of reception by said receiving means of the reflection of the last transmitted sound pulse from said roadway surface.

5. In a system for detecting the presence of e vehicle in a detection zone defined by a beam of repetitive energy pulses which are transmitted toward and impinge upon the reflecting surfaces of said vehicle the combination comprising, transmitting means for transmitting said pulses in the absence of reflection pulses at a rate selected to provide a pulse period which exceeds the round-trip propagation time of a pulse from said transmitting means to the most remote reflecting surface likely to be encountered and back to a receiving means, said receiving means including a transducer positioned and directed to received reflections of the transmitted pulses, control means governed by said receiving means and controlling said transmitting means to transmit a pulse substantially at the time of reception of a reflection pulse by said receiving transducer, and output means selectively governed by said transmitting means and including a relay whose energization current is varied in accordance with the rate at which said pulses are transmitted by said transmitting means, said relay being actuated to one of its two opposite conditions when a vehicle is within said detection zone and to the opposite of its two conditions when no vehicle is within said detection zone.

6. A system for detecting the presence of a vehicle as it passes through a detection zone defined by a beam of discrete energy pulses which impinge upon the reflecting surface of said vehicle when it is within said zone but impinge instead upon a more distant fixed reflecting surface when no vehicle is within said zone comprising, transmitting means for transmitting said pulses, receiving means including a transducer positioned and directed to receive reflections of said pulses both from said vehicle and alternatively from said fixed reflecting surface, control means for said transmitting means being governed by said receiving means and controlling said transmitting means to transmit a successive pulse substantially at the time of reception of each reflection pulse, said transmitting means including pulse generating means which is self-operating in the absence of reflection pulses and transmitts successive pulses when said control means is ineffective by reason of absence of said reflection pulses at a predetermined slow rate which provides a pulse period exceeding the round-trip propagation time of a pulse from said transmitting means to said fixed reflecting surface and back to said receiving transducer, whereby said transmitting means transmits said pulses at said predetermined slow rate when no reflections are being received but transmits said pulses at a first higher rate when reflection pulses are received from said fixed reflecting surface and at a still higher second rate when a vehicle is present in said detection zone, first and second rate-detection means being selectively controlled according to the rate at which pulses are transmitted by said transmitting means, said first rate-detection means being operable to a distinctive condition only when said transmitting means transmits said pulses at said second rate, said second rate-detection means being operated to a distinctive condition only when said transmitting means transmits said repetitive pulses at said predetermined slow rate, and output means being controlled to a distinctive state by operation of said first rate-detection means to its said distinctive condition wherein it indicates the presence of a vehicle in said detection zone, and means governed by said second rate-detection means for maintaining said output means in said distinctive condition when once operated thereto for as long as said second rate-detection means is in its said distinctive condition, whereby said rate-detection means is operated to its distinctive condition only once upon the passage of a vehicle through said detection zone even though said vehicle may have a plurality of separate sonic reflective surfaces separated by sound absorbing surfaces and with said reflective and absorbing surfaces passing in succession through said detection zone.

7. The system as defined in claim 6 wherein said transmitting means includes a transducer which is positioned over a roadway and is so directed that said fixed reflecting surface upon which said pulses impinge when no vehicle is present is the surface of said roadway.

8. A system for detecting the presence of a vehicle moving along a defined path and including, transmitting means including a transducer for transmitting successive pulses of energy across said path so as to impinge upon the reflecting surfaces of said vehicle, receiving means including a transducer upon which reflections of said pulses from said reflecting surfaces impinge, said transmitting means including an oscillatory pulse generator being self-operating in the absence of an external control and providing successive output pulses when self-operating with a period greater than the transit time of a transmitted sound pulse between said transmitting and receiving transducers when reflected from said reflecting surfaces, means governed by the reception of a reflection pulse by said receiving means for controlling said pulse generator to generate the next successive pulse ahead of the time it would ordinarily generate such next pulse if self-operating, said pulse generator including an astable binary device having first and second states and operating itself regularly in the absence of any external control between its first and second states and providing one of said pulses each time it is operated from said first to said second state, each pulse provided by said receiving means in response to a reflection pulse operating said binary device only when in its said first state to said second state to thereby generate the next successive pulse, said binary device maintaining itself in said second state for a length of time only slightly less than the minimum expected propagation time of a pulse between said transmitting and receiving transducers when reflected from said reflecting surfaces, whereby spurious reflection signals impinging upon said transducer associated with said receiving means at times when reflections are not expected do not affect said pulse generator, and means controlled by the rate of operation of said pulse generator for giving a distinctive indication of the presence of a vehicle moving along said path and passing through the beam of successive pulses.

References Cited in the file of this patent

UNITED STATES PATENTS

| | | |
|---|---|---|
| 1,982,341 | Hitchcock | Nov. 27, 1934 |
| 1,995,606 | Edelman | Mar. 26, 1935 |
| 2,076,724 | Jacquet | Apr. 13, 1937 |
| 2,131,993 | Wittkuhns | Oct. 4, 1938 |
| 2,333,688 | Shepard | Nov. 9, 1943 |
| 2,454,772 | Chatterjea | Nov. 30, 1948 |
| 2,542,983 | Beatty | Feb. 27, 1951 |
| 2,622,140 | Muller | Dec. 16, 1952 |
| 2,702,342 | Korman | Feb. 15, 1955 |
| 2,914,764 | Flower | Nov. 24, 1959 |